United States Patent [19]

Hennig et al.

[11] 4,254,531
[45] Mar. 10, 1981

[54] STRIPPING DEVICE

[75] Inventors: Kurt Hennig, Munich; Manfred Klein, Ismaning, both of Fed. Rep. of Germany

[73] Assignee: Gebr. Hennig GmbH, Ismaning, Fed. Rep. of Germany

[21] Appl. No.: 44,771

[22] Filed: Jun. 1, 1979

[30] Foreign Application Priority Data

Jun. 6, 1978 [DE] Fed. Rep. of Germany ... 7816943[U]

[51] Int. Cl.² .............................................. F16C 29/08
[52] U.S. Cl. .................................. 15/256.5; 308/3.5; 409/137
[58] Field of Search .............. 15/103, 245, 246, 256.5, 15/256.51; 308/3 A, 3.5; 29/DIG. 94; 408/67; 409/137; 82/32, 34

[56] References Cited

U.S. PATENT DOCUMENTS

| 1,762,043 | 6/1930 | Ayres | 15/256.5 |
| 2,555,223 | 5/1951 | Cox | 308/3.5 |
| 3,515,444 | 6/1970 | Grabner | 308/3.5 |
| 3,691,588 | 9/1972 | Hennig et al. | 15/256.5 |

Primary Examiner—Edward L. Roberts
Attorney, Agent, or Firm—Learman & McCulloch

[57] ABSTRACT

A stripping device having a plurality of abutting holder sections each of which carries a stripping lip. Abutting holder sections are joined to one another by a connecting element fitted into recesses and spanning the joint between adjacent sections. Abutting stripping lips are similarily joined to one another. Each holder section has a groove in one edge thereof in which the associated stripping lip is removably accommodated.

19 Claims, 11 Drawing Figures

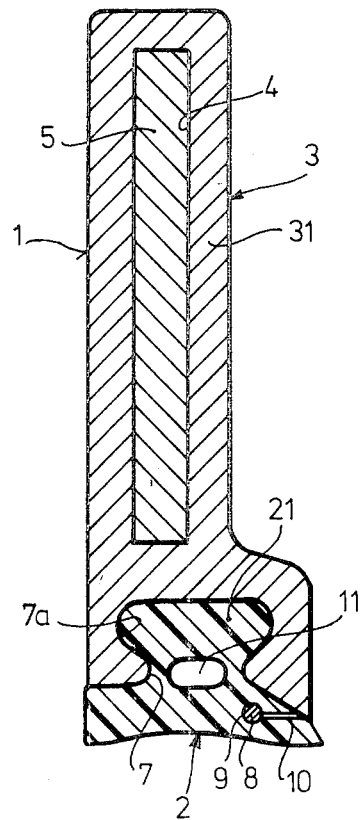
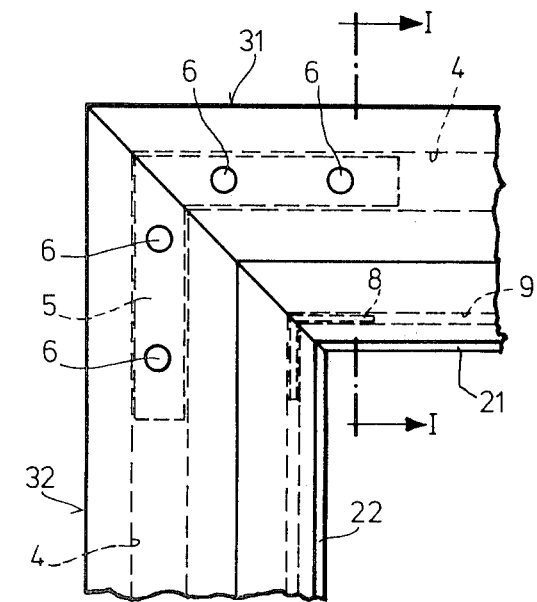
FIG. 1
FIG. 2

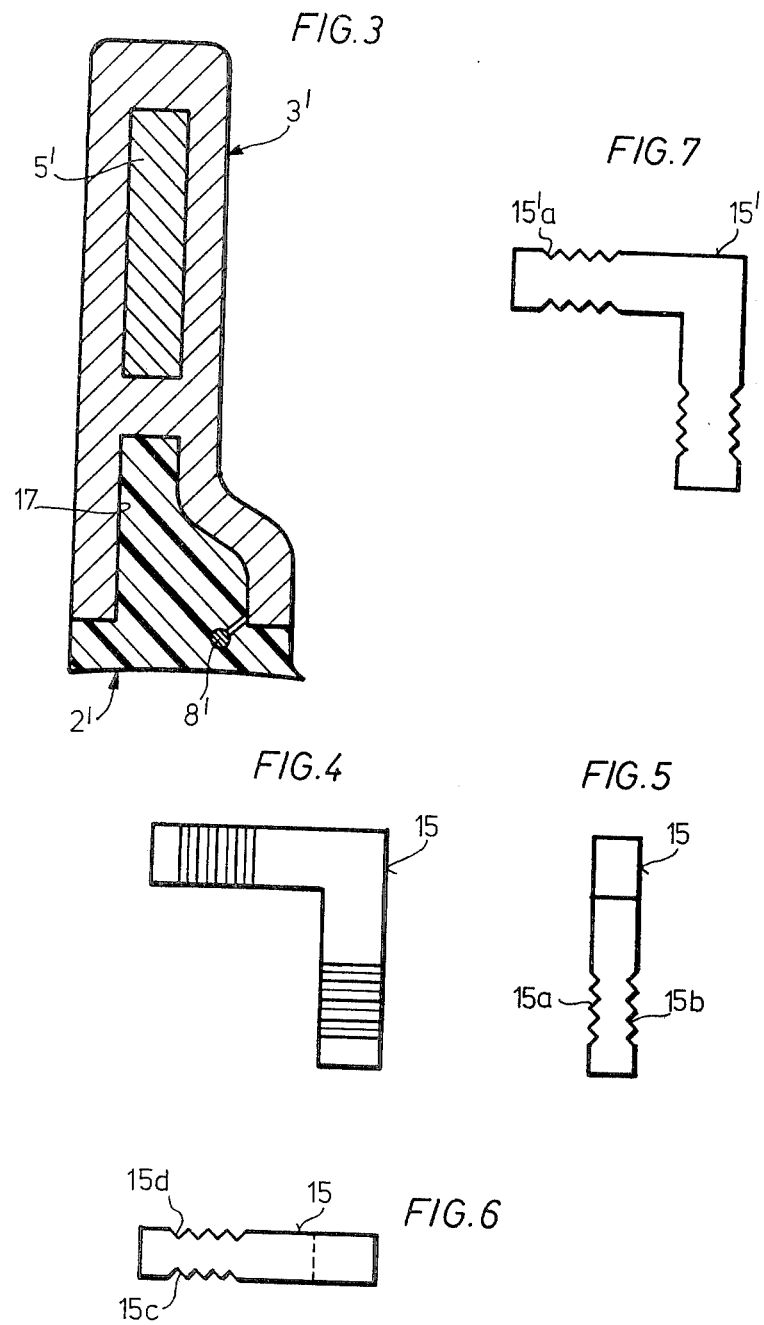

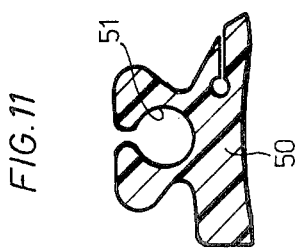
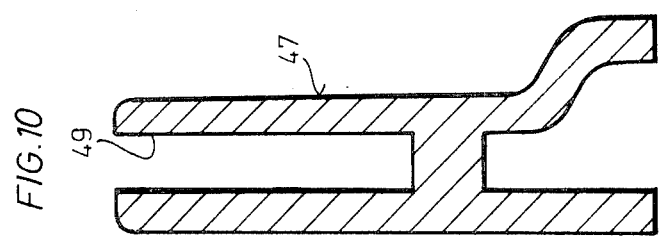
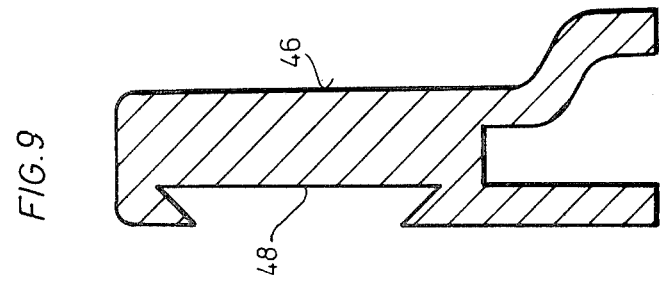
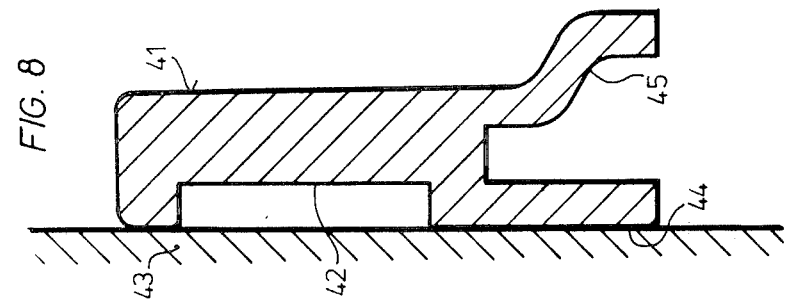

STRIPPING DEVICE

BACKGROUND OF THE INVENTION

This invention relates to a stripping device for part of a machine tool mounted for reciprocation on a guide, the stripping device comprising an elastic stripping lip and a holder which accommodates the stripping lip and which is intended to be fixed to the moving machine part In known stripping devices, the holder for the stripping lip generally consists of sheet steel bent for example into the form of a substantially U-shaped rail. Since stripping devices such as these generally have to engage around edges of the machine tool guide, the holders have to be assembled from several individual parts. In conventional constructions, these individual parts of the holders, which generally adjoin one another at an angle, are normally welded to one another at the joints.

The major disadvantage of conventional constructions lies in their high manufacturing costs which are attributable to the need to machine the steel plates forming the holder and to the need to weld the individual parts of the holder at the joints.

SUMMARY OF THE INVENTION

The objects of the present invention are to obviate the above mentioned disadvantages and to provide a stripping device of the type referred to above which is distinguished by its particularly simple and economic manufacture.

According to the invention, these objects are achieved in that the holder of the stripping lip consists of adjacent profile sections which are joined together by plug-type connecting elements which engage in recesses formed in the profile sections. The profile sections of the holder preferably are formed of aluminium.

The solution provided by the invention is distinguished by the particularly simple and economic production and machining of the holder and, above all, enables the stripping device to be produced simply in any required shape and size on the unit construction principle (adjacent sections of the holder being joined together by plug-and-socket connections).

The stripping lip preferably is divided up into several lip sections corresponding to the lengths of the individual sections of the holder, adjacent lip sections advantageously being joined together by a plug-type connecting element in order to ensure that a smooth, non-displaceable transition between adjacent lip sections is obtained at the joints as well.

According to the invention, the profile sections of the holder joined together by plug-type connecting elements are further secured by an additional connection established for example by deformation or spot welding.

DESCRIPTION OF THE DRAWINGS

These and other features of the invention are described in detail in the following with reference to several embodiments of the invention illustrated in the accompanying drawings, wherein:

FIG. 1 is a cross sectional view through a stripping device and taken on the line 1—1 of FIG. 2;

FIG. 2 is a plan view of a part of the stripping device illustrated in FIG. 1;

FIG. 3 is a sectional view similar to FIG. 1 of a second embodiment;

FIGS. 4, 5 and 6 are elevational views of examples of a plug-type connecting element;

FIG. 7 is an elevation of another variant of a plug-type connecting element; and FIGS. 8 to 11 illustrate further embodiments of the holder sections and the stripping lip.

DETAILED DESCRIPTION OF THE INVENTION

The stripping device shown in FIGS. 1 and 2 is intended to be fixed to a part (not shown) of a machine tool mounted for reciprocation on a guide. The stripping device rests on this moving part of a machine tool (for example, a guide cover) at the surface 1, for example, and is connected, for example, by means of screws to this moving machine part.

The stripping device consists essentially of an elastic stripping lip 2 and of a holder 3 which accommodates the stripping lip and which is intended to be fixed to the moving machine part.

The holder 3 is made up of individual hollow profile sections arranged adjacent one another. The partial view in FIG. 2 shows two holder sections 31 and 32 which adjoin one another at a right angle.

In the upper region of their cross section, the hollow profile sections (for example 31, 32) of the holder formed of extruded aluminium comprise a continuous, hollow recess or space 4 of substantially rectangular cross-section and closed on all sides except its ends. A plug-type connecting element 5 is accommodated in the profile hollow spaces 4 of adjoining holder sections (for example 31, 32), and is shaped in accordance with the required angle between the holder sections to be joined together (in the arrangement shown in FIG. 2, the plug-type connecting element 5 forms a right angle).

In order to increase the strength of the connection between the holder sections 31, 32 and the plug-type connecting element 5, the connecting element 5 is provided in the embodiment shown in FIG. 2 with four openings 6 into which the constituent material of the holder sections 31, 32 is partly pressed by pressure deformation.

In the lower region of their cross section, the holder sections (for example 31, cf. FIG. 1) comprise a downwardly open groove 7 intended for releasable engagement of the stripping lip 2.

The stripping lip 2 is divided up into several lip sections (for example 21, 22) corresponding to the lengths of the individual holder sections (for example 31, 32). At the joint between adjacent lip sections (for example 21, 22) the adjacent sections are joined together by a plug-type connecting element 8. To this end, each lip section has a continuous recess 9 which opens outwards through a narrow slot 10 and which is used to receive the plug-type connecting element 8. This plug-type connecting element 8 may be formed, for example, by a flexible wire or by a suitably shaped plastics moulding. It provides for a smooth transition, protected against undesirable displacements, between the adjacent lip sections (for example 21, 22) in the vicinity of the joint.

As shown in FIG. 1, the groove 7 (intended to accommodate the stripping lip 2) is provided in the lower cross-sectional region of the holder 3 with an undercut 7a in which the stripping lip 2 engages in form-locking manner. In order to make it easier for the stripping lip 2 to be snapped into this undercut groove, the stripping lip 2 is provided with an opening 11 which increases its deformability.

In the embodiment illustrated in FIG. 3, the groove 17 of the holder 3' does not have an undercut. The stripping lip 2' may be held in this groove 17 either by elastic interlocking or by being cemented in the groove. As in the previously described embodiment, adjacent holder sections are joined together by a plug-type connecting element 5' whilst adjacent lip sections are joined together by a plug-type connecting element 8'.

FIGS. 4 to 6 show another embodiment of a plug-type connecting element 15 which may be substituted for the element 5. At both ends, it is provided on its broad sides with a notched or toothed profile 15a, 15b, 15c, 15d. After the adjacent holder sections 31, 32 are pushed onto the plug-type connecting element by which they are joined together, the holder sections are deformed inwardly by external pressure in the region of the notches 15a to 15d, so that a firm connection is established between the assembled holder sections.

In the embodiment shown in FIG. 7, toothed or notched profiles (for example 15'a) are provided on the narrow sides of the plug-type connecting element 15'. In this case, too, a form-locking and friction-locking anchorage is established by subsequently subjecting the holder sections to pressure deformation inwards in the vicinity of these notched profiles.

It is obvious that the additional connection between the holder sections and the plug-type connecting element may also be established, for example, by spot welding, cementing, heat shrinking, or cold pressing.

That part of the profile spaces of the holder sections which is not used for accommodating the plug-type connecting elements is best filled with a known medium of low compressibility in order to prevent compression of the holder sections during fixing of the latter to the moving part of the machine tool.

FIG. 8 shows a holder section 41 fixed to a movable machine part 43. The holder section 41 has a recess 42 therein which is closed on three sides, its open side facing the movable machine part. The recess 42 is adapted to accommodate a plug-type connecting element 5 which preferably terminates flush with the fixing surface 44 of the holder section 41. The recess 45 accommodates the stripping lip (not shown).

FIGS. 9 and 10 show two further variants of holder sections 46 and 47 with outwardly open recesses for receiving the plug-type connecting elements. According to FIG. 9, the recess 48 has a dovetail cross-sectional profile for the accommodation of a complementally shaped connecting element. In the variant shown in FIG. 10, the recess 49 is open towards one narrow side of the holder section 47.

Finally, FIG. 11 shows a stripping lip 50 which is intended, for example, to engage in a holder of the type illustrated in FIG. 1. In this case, the opening 51 which increases the deformability of the snap-in region is outwardly open.

We claim:

1. A stripping device adapted for mounting on a machine tool and the like comprising holder means composed of a plurality of separate holder sections abutting one another with a joint therebetween, each of said holder sections having a recess therein, the recess in each holder section being in communication with the recess in the abutting holder section; a plug-type connecting element non-rotatably accommodated in the recess of each adjacent holder section and spanning the joint therebetween; and a stripping lip carried by each of said holder sections and projecting beyond one edge thereof.

2. A stripping device according to claim 1 wherein each of said stripping lips has a length corresponding to that of its associated holder section.

3. A stripping device according to claim 2 wherein each of said stripping lips abuts an adjacent stripping lip.

4. A stripping device according to claim 3 wherein each of said stripping lips has a recess therein, the recess in each stripping lip being in communication with that of its adjacent stripping lip, and a plug-type connector being accommodated in the recess of each adjacent stripping lip.

5. A stripping device according to claim 4 wherein each of said recesses in said stripping lip opens outward through a slot.

6. A stripping device according to claim 1 wherein each of said recesses is closed at all sides except its opposite ends.

7. A stripping device according to claim 1 wherein each of said recesses is open at one side thereof.

8. A stripping device according to claim 7 wherein each of said recesses is dovetailed.

9. A stripping device according to claim 1 wherein each of said holder sections has a groove along one edge thereof, and wherein each of said stripping lips is fitted into the groove of its associated holder section.

10. A stripping device according to claim 9 wherein each of said grooves has an undercut portion in which a part of the associated stripping lip is accommodated.

11. A stripping device according to claim 10 wherein said part of each of said stripping lips is composed of deformable material.

12. A stripping device according to claim 11 wherein said part of each of said stripping lips has an opening therein to increase its deformability.

13. A stripping device according to claim 1 including means for fixing each of said connecting elements to adjacent holder sections.

14. A stripping device according to claim 13 wherein said fixing means comprises notches on each of said connecting elements in engagement with the adjacent holder sections.

15. A stripping device according to claim 13 wherein said fixing means comprises welding.

16. A stripping device according to claim 13 wherein said fixing means comprises cement.

17. A stripping device according to claim 1 wherein each of said connecting elements is fixed to its associated holder sections by thermal shrinking.

18. A stripping device according to claim 1 wherein each of said connecting elements is fixed to its associated holder sections by press fitting.

19. A stripping device according to claim 1 wherein that portion of each of said recesses not occupied by a connecting element is filled with a medium of low compressibility.

* * * * *